(12) United States Patent
Valloir et al.

(10) Patent No.: US 9,267,061 B2
(45) Date of Patent: Feb. 23, 2016

(54) STRUCTURAL ADHESIVES, PROCESS FOR THE PREPARATION THEREOF, AND APPLICATION THEREOF

(75) Inventors: Nicolas Valloir, le Barp (FR); Olivier Fradin, Pessac (FR); Christian Bret, Bordeaux (FR); Emilie Vaique, Saint Ciers sur Gironde (FR); Gerard Chiron, Gradignan (FR); Mathieu Roux, Villenave d'Ornon (FR)

(73) Assignee: Adhesifs et Composites Polymers, le Barp (FR)

( * ) Notice: Subject to any disclaimer, the term of this patent is extended or adjusted under 35 U.S.C. 154(b) by 0 days.

(21) Appl. No.: 14/007,186

(22) PCT Filed: Mar. 26, 2012

(86) PCT No.: PCT/FR2012/000106
§ 371 (c)(1),
(2), (4) Date: Nov. 1, 2013

(87) PCT Pub. No.: WO2012/131185
PCT Pub. Date: Oct. 4, 2012

(65) Prior Publication Data
US 2014/0053976 A1    Feb. 27, 2014

(30) Foreign Application Priority Data

Mar. 25, 2011 (FR) .................................... 11 00892

(51) Int. Cl.
*C08L 53/00* (2006.01)
*B32B 27/00* (2006.01)
*C09J 153/00* (2006.01)
*C09J 4/06* (2006.01)

(52) U.S. Cl.
CPC . *C09J 153/00* (2013.01); *C09J 4/06* (2013.01)

(58) Field of Classification Search
CPC ................................. C09J 153/00; C09J 4/06
USPC ............................................ 524/505; 156/332
See application file for complete search history.

(56) References Cited

U.S. PATENT DOCUMENTS 3,472,918 A * 10/1969 Guillet ........................ 522/135
2010/0084092 A1   4/2010 Curet et al.

FOREIGN PATENT DOCUMENTS

| EP | 0357304 A2 | 3/1990 |
| FR | 2914651 A1 | 10/2008 |
| WO | 9823658 A1 | 6/1998 |
| WO | 2008125521 A1 | 10/2008 |

* cited by examiner

Primary Examiner — William Cheung
(74) Attorney, Agent, or Firm — Larson & Anderson, LLC

(57) ABSTRACT

Composition which can be used in structural adhesives, essentially comprising a polymer system suitable for being used in a methacrylate matrix, said polymer system comprising styrene-free block copolymers formed from at least two blocks and preferably from at least three blocks, and said polymer system being solubilized in a matrix of linear or branched acrylic and/or methacrylic monomers and/or of cyclic methacrylates and/or of aromatic methacrylates. Application by incorporation into an adhesive formulation of methacrylate type.

18 Claims, 1 Drawing Sheet

T = 0 min    T = 5 min    T = 60 min

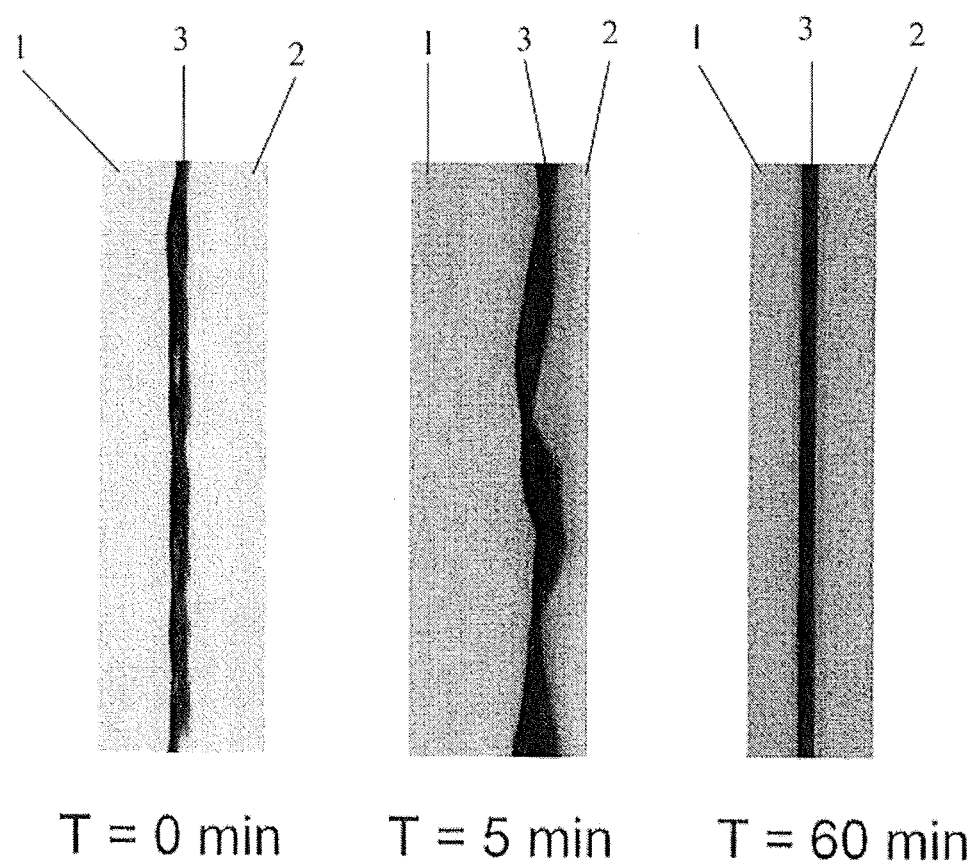

STRUCTURAL ADHESIVES, PROCESS FOR THE PREPARATION THEREOF, AND APPLICATION THEREOF

This is a National Stage entry of International Application No. PCT/EP2012/000106, with an international filing date of Mar. 26, 2012, which claims priority of France patent application No. 11/00892, filed Mar. 25, 2011.

TECHNICAL FIELD

The present invention relates to the field of the bonding of materials in order to form assemblies of identical or different substances. It relates more particularly to the bonding of substances capable of undergoing expansion during their use, among others the bonding and/or caulking of the decks and/or hulls of boats.

TECHNOLOGICAL BACKGROUND

For such uses, adhesives called structural adhesives are known, composed of two components, stored separately, one of which is a catalyst intended to carry out the polymerization of the other component which contains monomers.

Structural glues and adhesives comprise three broad families of polymers, which give the bonded joint its structure. These three broad families cross-link in different ways, and are incompatible with each other. They can be classified according to their modulus, characterized by their tensile-shear strength (TS), and their elasticity. These are epoxide-matrix, polyurethane-matrix and methacrylate-matrix adhesives.

Epoxide glues (epoxy/amine polyaddition) have a high modulus and TS ranging up to 40 MPa, but a low elongation of 3-5%.

Polyurethane-based glues (polyol/poly-isocyanate polyaddition) have a low modulus, of the order of 5-10 MPa TS, while having an elongation capable of reaching 100%.

Methacrylate-matrix glues (radical polyaddition) have a high modulus (20 to 30 MPa TS), but a low average elongation, not exceeding 40%.

The methacrylate-based glues have the best compromise between a high modulus, giving the assembly a significant strength with respect to tensile stresses on the substrates, and a good fatigue resistance, contributed by the flexibility of the bonding joint.

Their resistance to ageing and to chemicals is excellent.

Furthermore, the application of the methacrylate-based glues is less demanding that that of the other structural adhesive products.

Document WO 98/23658 describes a curable composition that can be used for coatings or as an adhesive, comprising (a) a polymerizable monomer, (b) a core/shell polymer, and (c) a liquid polymerizable component capable of conferring strength when polymerized, while polymerizable monomers (a) and (c) must be different.

Document FR 07 02485 describes a structural adhesive composition comprising (a) at least one methacrylate ester monomer, (b) at least one elastomer block copolymer, (c) a selected elastomer, and (d) particles formed from a thermoplastic shell and an elastomer core, while component (b) must comprise at least one elastomer block copolymer containing styrene and at least one second monomer.

Document FR 06 11442 describes an adhesive composition that must comprise at least one methacrylate ester monomer; at least one elastomer chosen from polybutadiene, polyisoprene and polychloroprene; as well at least two elastomer block copolymers all comprising styrene among their monomer units.

Document EP 0 357 304 describes an acrylic structural adhesive composition comprising 50-75% of an methacrylate ester monomer; 0-15% of a polymerizable mono- or dicarboxylic acid having ethylenic unsaturations; 10-30% of a core/shell polymer; and 5-20% of an elastomeric polymer. However in practice, such a composition gives rise to problems, both as regards formulation, and also with respect to the application of the composition onto a surface.

Moreover adhesives exist that have a high elongation at rupture (ranging up to approximately 200-250%), but such adhesives have a low tensile/shear strength which prevents their use as structural adhesives.

More generally, the various conventional structural adhesives thus described or proposed have:
  elongation at rupture that is too low to allow the assembly of materials that may undergo high expansion;
  low elasticity, the corollary of which is polymer creep, an irreversible phenomenon that weakens the bonded joint and reduces its resistance to vibration or repeated stresses;
  a cross-linking time that is difficult to accept in industrial installations because it cannot be adapted according to the application, and
  joint thickness that is limited in practice to a range of 250 to 300 micrometers.

Thus there is remains a need to carry out bonding of various materials under cost-effective conditions, without primer or primary adhesive layer, with rapid curing and above all with a durability and resistance to mechanical and/or thermal stresses ensuring that the integrity of the bond and of the bonded pieces is maintained. This requirement is even more important for the decks and/or hulls of vessels, for which the bonding and/or caulking involves wood, particularly teak, and an assembly of metal substrates, polymer substrates and/or a substrate itself made of wood.

DISCLOSURE OF THE INVENTION

It has now been discovered that all these properties can be significantly improved, and the abovementioned drawbacks avoided, by means of an adhesive composition according to the invention, which comprises a polymer system implemented in a methacrylate matrix,
said polymer system being based on styrene-free sequenced copolymers (also called block copolymers), formed from at least two blocks and advantageously at least three blocks, and
said polymer system being solubilized in a matrix of linear or branched acrylic and/or methacrylic monomers, and/or cyclic methacrylates and/or aromatic methacrylates,
while said matrix is included or intended to be included in a conventional adhesive formulation of methacrylate type.

The resulting formulation can advantageously be polymerized by a standard redox system, such as for example the one usually implemented for any methacrylate formulation.

Thus a first subject of the invention is a composition capable of being incorporated into structural adhesives, essentially comprising a polymer system capable of implementation in a methacrylate matrix,
said polymer system comprising styrene-free sequenced copolymers (also called block copolymers, for example A, B, C, etc.), formed from at least two blocks and advantageously at least three blocks, and said polymer system being solubilized in a matrix of linear or branched acrylic and/or methacrylic monomers, and/or cyclic methacrylates and/or aromatic methacrylates, while said matrix is included or intended to be included in a conventional adhesive formulation of methacrylate type.

In an embodiment, the styrene-free block copolymers of said polymer system (wherein said blocks are in standard fashion called A, B, C, etc.) are essentially constituted by thermosetting and/or thermoplastic polymers, having for example sequences A-B-A-, or A-B-B-A- or also A-A-B-.

The units involved in the abovementioned block copolymers can advantageously, but non-limitatively, be chosen from methacrylate units, and more preferentially methacrylates with 5 carbon atoms, of the methyl methacrylate type, and/or 8 carbon atoms, of the butyl methacrylate type.

In a variant, the units involved in the abovementioned sequenced copolymer or block copolymer can be functionalized. Useful functions for such a functionalization are particularly the acid or hydroxyl functions, and preferentially methacrylic acid functions.

In an advantageous implementation, said block copolymers are nanostructured block copolymers. Nanostructured polymers are known to a person skilled in the art and can be prepared and/or analyzed by him on the basis of his ordinary skill, if necessary with the aid of suitable bibliographic references.

According to the invention, the block copolymer thus prepared is solubilized in a matrix of linear and/or branched, aliphatic acrylic and/or methacrylic monomers, and/or cyclic methacrylates and/or aromatic methacrylates, in order to produce a composition suitable for use in structural adhesives.

Advantageously, the block copolymer is thus solubilized at more than approximately 5% by weight or by volume and preferably more than approximately 10% by weight or by volume of the copolymer in said matrix.

In another aspect, the invention relates to a structural adhesive formulation comprising a composition as described above in a methacrylate matrix. Said conventional methacrylate matrix can, if desired, also comprise styrene elements, such as particularly SBR (styrene butadiene rubber) and/or SBS (styrene butadiene styrene) and/or NBR (nitride butadiene rubber) and/or SEBS (styrene ethylene butadiene styrene) and/or SBM (styrene butadiene methyl methacrylate).

In another aspect, the invention relates to an adhesive formulation such as described here, for achieving bonding of surfaces of materials that are identical or different, while the bonding has a tensile/shear strength of approximately 8 to 25 MPa according to the materials and the thicknesses of adhesive applied.

The invention also relates to a method for obtaining such a formulation, in which:
  a polymer system comprising styrene-free block copolymers, formed from at least two blocks and advantageously at least three blocks is prepared or produced, and
  said polymer system is solubilized in a matrix of linear or branched acrylic and/or methacrylic monomers, and/or cyclic methacrylates and/or aromatic methacrylates,
  said matrix is incorporated or recommended for incorporation in a conventional adhesive formulation of methacrylate type.

Based on the prior art and his ordinary skill, a person skilled in the art is capable of selecting suitable constituents for the preparation of a composition according to the invention, by simple routine tests, in each application envisaged.

A subject of the invention is also the use of a formulation according to the invention for carrying out bonding operations implementing a standard redox system, advantageously on substances such as glass, polystyrene, ABS, polyester, polycarbonate, aluminum, steel, stainless steel, galvanized steel, and/or PMMA, among others.

In yet another aspect, the invention relates to the bonding and/or caulking of wood, onto an assembly of metal substrates, polymer substrates or also wood to itself, particularly for decks and/or hulls of vessels.

Caulking is a well known technique, in particular in the field of sealing the wood decks of vessels, for which it is necessary for the caulking to be polyvalent, durable and effective on all types of decks, particularly those made of teak, with moreover a requirement for ease of use.

Currently, the caulking of the teak decks of vessels is carried out mainly with polyurethane-based caulking compositions, but also with other polymers such as the MS polymers for example. MS polymers are methacrylate-styrene based elastomeric polymers, which act as impact modifiers by conferring elasticity on the compositions applied onto the support to be caulked or bonded.

The caulking of vessel decks, particularly teak decks, cannot be envisaged using such bases.

In fact, the current techniques for caulking the decks of vessels require:
  the application of a primer,
  the greatest care in order to compensate in advance for the post cross-linking shrinkage of the composition applied to the grooves of the wood,
  a long drying time before sanding, a necessary step, can be undertaken, and
cannot prevent
  insufficient tensile/shear strength of the joint,
  insufficient elasticity of the caulking joints,
  the appearance of cracking,
  insufficient UV radiation resistance, and
  insufficient wet ageing resistance.

But there is also a need to carry out such caulking under acceptable conditions of practicality, efficiency and cost-effectiveness.

In this respect, the composition and the method of obtaining it according to the present invention have been proven to allow exceptional performance to be attained in caulking operations on wood, particularly teak, decks of vessels.

Such compositions used as caulking substances in these applications can be implemented according to a method that is significantly simpler and has better performance than the one conventionally used for caulking at present. It has been found moreover that the implementation of caulking in this way also ensures excellent bonding of wood substrates, particularly of wood laths, in particular teak laths on composite decks or on all other surfaces of a substrate clad with wood laths.

The formulation of caulking and of adhesive such as described here can thus be intended for caulking and optionally for the bonding of surfaces of materials that are identical to each other or different, such as wood-wood (for example teak to teak or other wood), teak onto a composite substrate, etc.), while the caulking/bonding that it achieves via the method described hereinafter can provide a tensile/shear strength of approximately 8 to 25 MPa, and exceptional resistance to wet ageing with the materials in question and at the same thicknesses as those applied in standard fashion with conventional caulking compositions.

In this respect, a subject of the invention is in particular the use of a formulation according to the invention for carrying out caulking or caulking/bonding operations implementing a standard redox system, advantageously on substances such as glass, polystyrene, ABS, polyester, polycarbonate, aluminum, steel, stainless steel, galvanized steel, and/or PMMA, among others.

In this respect, another subject of the invention is a method of caulking or of caulking/bonding comprising the essential steps of:

a) degreasing the wood to be caulked and the deck of the vessel concerned,
b) application of the bonding/caulking composition according to the invention, advantageously under water, and laying the teak on the deck,
c) filling the grooves with said composition while causing the resin applied to form a slight protrusion to allow it to compensate for post cross-linking shrinkage,
d) standard cross-linking of the composition applied, and
e) removal by sanding of the excess caulking/bonding composition from the surface of the joints thus applied and cured, after a duration which may not exceed approximately 2-4 hours.

As a reminder, it is convenient to recall here that conventional caulking methods necessarily comprise the steps of:

degreasing the surface (for example of the teak and the deck),
application of a primer onto the teak and optionally onto the substrate, which can be for example made of a composite,
application of the glue and laying of the teak,
filling the grooves to be caulked with the polymer, but making sure to compensate sufficiently for the post cross-linking shrinkage, as the grooves are generally 6 to 8 mm wide,
removal by sanding after 3 to 4 days of the excess glue protruding from the grooves.

The advantages which it has been possible to reveal via the implementation of the present invention, by comparison with the conventional technique, are essentially:

no primer to be applied and direct bonding on the material to be caulked, thus saving time both in application and in drying,
less shrinkage, of the order of only 1.2%,
suitability of the joint for sanding after only approximately 2 to 4 hours, as against 3 to 4 days,
significantly greater tensile-shear strength,
greater elasticity, ranging up to 400% as against 150-200% with the caulking polymers currently used, which represents an undeniable advantage for teak, as it is a wood which expands and shrinks according to its moisture content,
no cracking, whereas cracks are currently formed,
significantly better UV radiation resistance than with the polymers currently used, and
better wet ageing resistance than in the case of the polymers currently used.

In this field of caulking/bonding for boats, as in other fields, a remarkable feature of the technique according to the present invention is that the bonding and/or caulking operations can perfectly well be implemented under water.

Structural adhesives are bi-component products, which can thus comprise an adhesive formulation composition according to the present invention and a catalyzing agent, intended to allow the polymerization and curing of the adhesive formulation.

The invention will be better understood, and other aims, advantages and features of the latter will become more clearly apparent in the light of the detailed description hereinafter of preferred embodiments.

These embodiments are supplied purely for the purposes of illustration and are in no way limitative, while a single FIGURE is attached to the present description, showing a cross-sectional view of a portion of an assembly of two pieces (1, 2; in grey) bonded together over a defined area by means of a structural adhesive (3; in black).

EXAMPLES

Procedure for the Preparation of a Composition Capable of Use in Structural Adhesives According to the Invention 20 g of block copolymer and 70 g of an acrylic or methacrylic monomer matrix were placed in a reactor equipped with mixing and dispersion devices, preferably having a flat base. Stirring was carried out for approximately 10 min at ambient temperature, and then 6 g of rheological additives and 4 g of adherence additives were added, both of the types known to a person skilled in the art. Stirring was carried out for another 20 min, and 1 g of amine was introduced. After standard homogenization for a sufficient time, in practice for approximately 10 min, a crude product, thixotropic and having a more or less dark brown color, was obtained.

According to the uses for which it is intended, it is possible to color this product using organic or mineral pigments.

Compositions for incorporation into structural adhesives of the methacrylate type prepared according to this procedure were selected within the value ranges for the constituents given below:

|  | % by weight |
| --- | --- |
| Block copolymers | 1-40 |
| Acrylic and/or methacrylic monomers | 1-90 |
| Epoxide | 1-40 |
| Amide | 1-40 |

Note:
The total of the constituents present in a single formula is then substantially equal to 100%.

Optionally, the structural adhesive can comprise additional elements in the adhesive formulation of the standard methacrylate type, particularly chosen from SBR and/or SBS and/or NBR and/or SEBS and/or SBM.

By way of example of variant embodiments of the invention, block copolymer matrices were prepared having compositions within the following ranges and choice of substances:

From 5 to 60%, and more particularly from 10 to 30%, by weight of MAM-ABU-MAM or MAM-BU-MAM block copolymer, functionalized or not. In these blocks or sequences of copolymers, MAM=methyl methacrylate, ABU=butyl acrylate, BU=butadiene.

From 40 to 95%, and more particularly from 70 to 90% by weight of linear and/or branched, cyclic, aromatic, and/or aliphatic acrylates and/or methacrylates, having in their formula more than 5 carbon atoms, advantageously from 5 to 10 carbon atoms, of the methyl methacrylate, ethyl methacrylate, propyl methacrylate, butyl methacrylate, pentyl methacrylate, hexyl methacrylate, benzyl methacrylate, cyclohexyl methacrylate type and others, for forming the solubilization matrix of the block copolymers.

The following is an example range of glues according to the invention (wherein the percentages given are by weight):
- 40 to 87.50%, advantageously 60 to 80%, of block copolymers according to the invention;
- 10 to 40% of acrylates and/or methacrylates, advantageously 15 to 25% of methacrylates according to the invention, as described above;
- 1 to 10%, advantageously approximately 5%, of physical and/or chemical rheological additives, advantageously approximately 5% of physical rheological additives;
- 1 to 10%, advantageously approximately 5%, of adherence additives;
- 0.5 to 5% of one or more aromatic, heterocyclic or aliphatic amines, said amines capable of being primary, secondary and/or tertiary, and advantageously approximately 1% of secondary and/or tertiary amines.

The cross-linking system can be a conventional radical cross-linking system, primed by a peroxide system and/or by azonitriles.

The production of such a product for structural adhesive formulation is validated by verifying that the crude product has a density close to 1, more particularly $d_{20°\,C.}=0.97\pm0.03$, and a viscosity $V_{20°\,C.}=15\pm2$ Pa·s.

Once applied and cross-linked, such a formula according to the invention after 24 h has an elongation at rupture of approximately 400% and a tensile-shear strength on aluminum Alu 6060 of at least 12 MPa.

A wet poultice (7 days at 70° C., 100% humidity, then at −20° C. for 2 h) resulted in a cohesive rupture at 8 MPa.

By way of comparative example, a conventional formula structural adhesive was prepared by combining approximately 70% of methyl methacrylate; between approximately 1 and approximately 10% of physical and/or chemical rheological additives, advantageously such additives are physical, at a rate of approximately 5%; approximately 1 to approximately 10%, advantageously approximately 5%, of adherence additives; and approximately 0.5 to 5%, of at least one aliphatic, heterocyclic, aromatic, primary, secondary and/or tertiary amine, advantageously approximately 1% of at least one secondary and/or tertiary amine.

In the same tests as those described above, the elongation at rupture on pieces of materials each time identical or comparable was only 5%, while the tensile-shear strength on Alu 6060 was 18 MPa. Moreover, in the case of a wet poultice there was no resistance after 7 days (at 70° C. and 100% humidity, then −20° C. for 2 h).

By way of illustration, reference may be made in this regard to test methods:
- Tensile properties ISO 527A
- Speed of displacement of the arm: 10 mm·min$^{-1}$
- Test piece geometry of: width×thickness (mm)=10×4.
- Shear tests based on the standard NF EN 1465 (NF T 76-107)
- Speed of displacement of the arm: 5 mm·min$^{-1}$
- Test piece geometry of: length×width×thickness (mm)=100×25×4.
- In practice, the coating is approximately 300 mm.
- Wet Poultice D47-1165 (70° C. for 7 days, 100% humidity and 2 hours at −20° C.)

By following these test methods, the following results were thus obtained with different formulae referenced SAF according to the invention:

|  | SAF 30 | SAF 150-1 | SAF 150-2 | SAF400 | SAF401 |
|---|---|---|---|---|---|
| Ratio (hardener/resin) | 1/10 | 1/10 | 1/1 | 1/10 | 1/1 |
| Tensile-shear stress in MPa (aluminum 6060) | 20-24 | 15-17 | 15 | 5 | 11 |
| Young's modulus MPa | 220 | 100 | 20 | 1-2 | 12-15 |
| Elongation (in %) | 30 | 150 | 150 | 400 | 400 |

Tests of Bonding of Identical or Different Materials

The bonding composition according to the invention was incorporated into a standard adhesive base of methacrylate type, itself capable of comprising one or more styrene components, but advantageously not comprising these. The adhesive formula thus formed polymerizes by means of a standard redox system, like any conventional methacrylate-based adhesive formulation.

Without wishing to be bound by any theory, it is estimated that the structural adhesive formulation according to the invention derives its originality and its remarkable properties from the choice of the selected block copolymers and from the selected monomers, which contribute to optimizing the elastic properties, unlike a simple mixture of similar constituents, which attains only approximately one-third of the properties identified below.

Tests have thus been carried out with formulations according to the invention essentially comprising:

| | |
|---|---|
| Solution of block copolymers | 70% by weight |
| Mixture of methacrylates | 20% by weight |
| Rheological additives/adherence additives | 5% by weight |
| Various | 5% by weight |

In standard assessments for the appropriate tests, these compositions showed the following characteristics:

| | |
|---|---|
| Elongation | >400% |
| Tensile-shear strength: | from 6 to 25 MPa |
| Young's modulus | from 2 to 300 MPa |
| Temperature resistance | up to 220° C. |
| Wet poultice | 8 days |

Substantial elasticity of the bonding joints was thus obtained, while retaining a high Young's modulus.

Such distinctive features were identified in particular with formulations according to the invention comprising:
(1) block copolymers formed from at least 2 blocks and even preferentially at least 3 blocks, and
(2) in such block copolymers, alternate blocks (particularly A-B-A-, A-B-B-A-, A-A-B-, A-A-B-B-C-, among others) the A, B, C units of which are as defined above, and optionally functionalized by acid, hydroxyl and/or methacrylic acid functions.

THE BRIEF DESCRIPTION OF THE FIGURE

By carrying out tensile-shear tests based on the standard NF EN 1465 (NF T 76-107) on such an assembly, the results displayed in the attached FIGURE were obtained, at T=0 min, T=5 min, and T=60 min. The display means were a dynamometer (Instron model) coupled to a computer equipped with suitable software.

The elongation at rupture found was approximately 400%, while tests of this type were carried out on assemblies of different materials by means of a bonded joint according to the invention having a thickness capable of ranging from 250 micrometers to 25 millimeters.

After cross-linking, such formulations according to the invention can even withstand over 200° C., which allows use on substrates that are to be painted by powder-coating.

The materials forming the substrate capable of thus being bonded to themselves or to each other are in particular, but not exclusively, aluminum, magnesium-based alloys, titanium-based alloys, steel, galvanized steel, stainless steel, polyesters, glass, PMMA (polymethyl methacrylate), polycarbonates, PVC, thermoplastics, thermosetting plastics, and similar.

Bonding with the means according to the invention can thus relate to a large number of substrates, and specifically wood and/or glass, without primer.

Advantageously the bonding and/or caulking according to the invention can thus involve bonding with caulking of teak onto an assembly of metal substrates, polymer substrates and/or itself. Bonding resistant to heat, cold, and to UV is thus obtained.

In summary, bonding carried out with adhesives prepared according to the present invention differ from those of the current adhesives in that they can offer, among other things:
  elongation at rupture ranging up to more than 400-450%, i.e. 10 times greater than a conventional methacrylate-based adhesive;
  tensile-shear strength capable of reaching 6 MPa on alu/alu, i.e. 2 to 4 times greater than adhesives based on PU or MS polymers, which have respective elongations of approximately 150% and 200%;
  high elasticity, demonstrated by a modulus of elasticity capable of reaching 2 MPa, as against 250 MPa with the conventional methacrylates, therefore without creep, since the lower the modulus of elasticity, the more elastic is the product;
  fully cross-linked bonding matrix, without the need for an internal plasticizer to be added thereto;
  elasticity maintained over time, despite the advantageous absence of plasticizer;
  excellent resistance to ageing, with in particular almost the same physical and chemical characteristics before and after ageing;
  excellent UV resistance, without any marked drop in the levels of the physical and chemical properties and without significant change in appearance;
  the ability to produce joints with a thickness of from 250 μm to over 2.5 cm, as well as bonding finer than 250 μm;
  cross-linking times adjustable up to 2 hours;
  very good resistance to wet poultice (7 days);
  adherence to all supports, without surface preparation, particularly for the bonding together of several substrates, identical or different, in particular glass, without the need to use a primer.

All these qualities mean that the structural adhesives according to the invention are particularly attractive for bonding all structural and/or mechanical elements, in industry and construction, as well as in all everyday applications.

The invention claimed is:

1. A structural adhesive composition comprising a polymer system present in a conventional adhesive methacrylate formulation,
  said polymer system comprising styrene-free block copolymers, formed from at least two blocks, and
  said polymer system being solubilized in a matrix of linear or branched acrylic and/or methacrylic monomers, and/or cyclic methacrylates and/or aromatic methacrylates.

2. The composition according to claim 1, wherein the polymer system comprises:
  40 to 87.50% of said block copolymers according to the invention;
  10 to 40% of acrylates and/or methacrylates;
  1 to 10% of physical and/or chemical rheological additives;
  1 to 10% of adherence additives; and
  0.5 to 5% of one or more aliphatic, heterocyclic or aromatic amines, said amines being capable of being primary, secondary and/or tertiary, and advantageously approximately 1% of secondary and/or tertiary amines.

3. The composition according to claim 1, wherein the styrene-free block copolymers of said polymer system are essentially constituted by thermosetting and/or thermoplastic polymers particularly having the sequences A-B-A-, A-B-B-A-, or A-A-B-.

4. The composition according to claim 1, wherein said block copolymers are nanostructured block copolymers.

5. The composition according to claim 4, wherein the polymer system comprises in the methacrylate matrix, methacrylate and/or SBR and/or SBS units.

6. The composition according to claim 4, wherein the units involved in said block copolymer contain a functional group selected from the group consisting of: acid, hydroxyl, and methacrylic acid.

7. The composition according to claim 1, wherein the block copolymer is solubilized in a matrix of linear and/or branched, aliphatic acrylic and/or methacrylic monomers, and/or cyclic methacrylates and/or aromatic methacrylates.

8. The composition according to claim 7, wherein the block copolymer is solubilized to more than approximately 5% by weight or by volume, and advantageously more than approximately 10% by weight or by volume of the copolymer in said matrix.

9. The composition according to claim 1, wherein the polymer system comprises:
  from 5 to 60%, and more particularly from 10 to 30%, by weight of MAM-ABU-MAM or MAM-BU-MAM block copolymer, functionalized or not, while MAM=methyl methacrylate, ABU=butyl acrylate, and BU=butadiene; and
  from 40 to 95%, and more particularly from 70 to 90% by weight of linear and/or branched, aliphatic, cyclic and/or aromatic, acrylates and/or methacrylates, having in their formula more than 5 carbon atoms, advantageously from 5 to 10 carbon atoms, of the methyl methacrylate, ethyl methacrylate, propyl methacrylate, butyl methacrylate, pentyl methacrylate, hexyl methacrylate, benzyl methacrylate, cyclohexyl methacrylate type and others, for forming the solubilization matrix of the block copolymers.

10. A method for preparing a formulation according to claim 1, the method comprising the steps of:
  preparing a polymer system comprising styrene-free block copolymers from at least two blocks and advantageously at least three blocks,
  solubilizing said polymer system in a matrix of linear or branched acrylic and/or methacrylic monomers, and/or cyclic methacrylates and/or aromatic methacrylates,
  incorporating said matrix in a conventional adhesive methacrylate formulation.

11. A method for using a composition for use in structural adhesives, said composition comprising a polymer system capable of implementation in a methacrylate matrix, said polymer system comprising styrene-free block copolymers, formed from at least two blocks, and said polymer system being solubilized in a matrix of linear or branched acrylic and/or methacrylic monomers, and/or cyclic methacrylates and/or aromatic methacrylates, the method comprising the step of bonding and/or caulking the composition employing a redox system.

12. The method according to claim 11, wherein the step is implemented on a substance selected from the group consisting of: glass, polystyrene, ABS, polyester, polycarbonate, aluminum, steel, stainless steel, galvanized steel, and PMMA.

13. The method according to claim 12, wherein the step is implemented on a deck or a hull of a boat.

14. The method according to claim 11, wherein the step is implemented on wood and/or a composite material.

15. The method of use according to claim 11, where said method is for caulking wood of a deck or a hull of a vessel, the method further comprising the steps of:

(a) degreasing a wood to be caulked,
(b) applying said composition, and laying the wood,
(c) filling grooves with said composition,
(d) standard cross-linking of the composition applied, and
(e) sanding excess composition from the grooves after it has been applied and cured.

16. The method according to claim 15, wherein in step (b) there is direct bonding of the composition onto the wood, and sanding occurs approximately 2 to 4 hours after the composition has been applied and cured.

17. The method according to claim 15, wherein step (c) is performed to cause the composition applied to form a slight protrusion above the grooves to allow compensation for post cross-linking shrinkage.

18. An adhesive combination comprising:
(a) the composition of claim 1, and
(b) instructions for using composition (a) as an adhesive.

* * * * *